United States Patent [19]

Lewis et al.

[11] Patent Number: 5,501,729
[45] Date of Patent: Mar. 26, 1996

[54] PITCH BASED IMPREGNANT FOR CARBON AND GRAPHITE AND METHOD

[75] Inventors: Irwin C. Lewis, Strongsville; Terrence A. Pirro, Cleveland, both of Ohio

[73] Assignee: UCAR Carbon Technology Corporation, Danbury, Conn.

[21] Appl. No.: 504,187

[22] Filed: Jul. 19, 1995

Related U.S. Application Data

[63] Continuation of Ser. No. 230,429, Apr. 19, 1994, abandoned, which is a continuation of Ser. No. 858,502, Mar. 27, 1992, abandoned.

[51] Int. Cl.⁶ .................................................. C09D 195/00
[52] U.S. Cl. ........................... 106/274; 106/236; 106/278; 204/290 R; 204/294
[58] Field of Search .................................. 204/290 R, 294; 106/236, 274, 278

[56] References Cited

U.S. PATENT DOCUMENTS

| 3,375,132 | 3/1968 | Geise | 204/294 |
| 4,140,832 | 2/1979 | Meregay | 427/114 |
| 4,554,024 | 11/1985 | Zimmer et al. | 106/278 |
| 4,762,566 | 8/1988 | Gseike | 106/284 |
| 5,076,845 | 12/1991 | Seo et al. | 106/274 |
| 5,372,702 | 12/1994 | Kojima et al. | 106/274 |

*Primary Examiner*—David Brunsman
*Attorney, Agent, or Firm*—F. J. McCarthy

[57] ABSTRACT

A pitch based impregnant for a carbon or graphite body and a method of impregnation. The method involves forming a liquid solution of a substantially solids free pitch having a Q.I. of less than 1% dissolved in furfural and containing an acid catalyst with the solution having a viscosity of less than 150 cps at room temperature and heating the impregnated body to between 150°–200° C. until the impregnant is cured.

5 Claims, No Drawings

PITCH BASED IMPREGNANT FOR CARBON AND GRAPHITE AND METHOD

This application is continuation of prior U.S. application: Ser. No. 08/230,429 Filing Date Apr. 19, 1994 now abandoned which is a continuation of application Ser. No. 07/858,502 Filing Date Mar. 24, 1992 now abandoned.

FIELD OF THE INVENTION

The present invention relates to an impregnant for a carbon or graphite body and more particularly to an improved pitch based impregnant and method for impregnating a carbon or graphite body so as to provide a carbon yield of at least 40% after carbonization without suffering impregnant runout.

BACKGROUND OF THE INVENTION

Carbon and graphite bodies are porous and many products fabricated from carbon or graphite require the carbon or graphite stock to be impregnated with a suitable impregnant such as a polymer resin or pitch to decrease its porosity and increase strength. Resins are subject to certain inherent disadvantages in that in general, they have high viscosities, low carbon yields and tend to form a glassy non-graphitizing carbon. For carbonaceous electrodes it is more common to use a pitch as the impregnant. Pitch is a complex mixture of polynuclear aromatics generally derived from the thermal treatment of coal tar or a petroleum tar. Typical impregnating pitches have coking values (MCC) of about 40–50%. However, these typical impregnating pitches are solid at room temperature and must be preheated to high temperature to transform them to a low viscosity liquid suitable for impregnation. It is also conventional to preheat the carbon or graphite electrode stock to an elevated temperature before adding the pitch impregnant. The electrode is then cooled to solidify the impregnant.

Pitch admixed with a polymerizable liquid has also been used for impregnation. A typical impregnant admixture for impregnating carbonaceous electrodes in the manufacture of chlorine includes a liquid solution of furfuraldehyde, a No. 15 vacuum coal tar pitch and a diethylsulfate catalyst. This is taught in U.S. Pat. No. 3,375,132 the disclosure of which is herein incorporated by reference.

After pitch is impregnated into the carbon or graphite body it is normally rebaked to carbonize the impregnant. About ⅓ of a conventional pitch impregnant composition runs out of the carbon body prior to coking thereby decreasing the ultimate impregnant carbon yield after carbonization to about 35%. The pitch which runs out of the rebaked stock presents a disposal problem and may also foul up the baking furnace. Currently a method employed to minimize the run out of pitch from the impregnated stock is to bake the electrode very slowly. This decreases productivity and increases production cost.

SUMMARY OF THE INVENTION

It has been discovered in accordance with the present invention that impregnant runout from carbon or graphite stock can be substantially eliminated using a low viscosity pitch impregnant, composed of pitch and a polymerizable liquid, which is thermosetting at low temperature. The pitch admixture of the present invention has an infusible solids content "Q.I." of less than about 1% i.e., solids which are insoluble in quinoline as noted in U.S. Pat. No. 4,1408332 and optimally less than 0.1 percent and a low viscosity at room temperature. A carbon or graphite body impregnated with the pitch based impregnant of the present invention will cure at a temperature of between 150° C. to 200° C. and the cured body can be placed directly into a graphitizing furnace without a rebake step which is normally employed using a high Q.I. pitch impregnant.

The pitch impregnant admixture of the present invention comprises a substantially infusible solids free pitch having a Q.I. of less than 1% dissolved in furfural to form a liquid solution containing at least 40% by weight pitch with a viscosity at room temperature of less than 150 cps and at least 5% by weight of an acid catalyst.

The method of the present invention for impregnating a carbon or graphite body with an impregnant so as to provide a carbon yield above 40% after carbonization comprises the steps of:

forming a liquid solution of a substantially solids free pitch having a Q.I. of less than 1% dissolved in furfural and containing an acid catalyst with the solution having at least 40% by weight of said pitch and a viscosity at room temperature of less than 150 cps;

impregnating said carbon or graphite body with said liquid solution; and heating said impregnated body to between 150–200° C. at atmospheric pressure until said impregnant is cured.

DETAILED DESCRIPTION OF THE PREFERRED EMBODIMENT

Carbon and graphite electrodes are generally impregnated with pitch to increase strength and density. The impregnation must be carried out at a high temperature in order to melt the pitch and achieve a low viscosity. Moreover, the pitch impregnant tends to run out of the electrode stock during rebake and causes disposal problems. It has been discovered that a pitch with a solids content of less than 1% dissolved in furfural to form a solution of low viscosity can be impregnated into a carbon or graphite body at room temperature to provide a carbon yield after carbonization of over 40%. This pitch solution is thermosetting at the cure temperature for the impregnant of between 150°–200° C. at atmospheric pressure. Essentially no run out of the pitch occurs during the rebake operation. This causes a substantially higher carbon yield and does not require the impregnated stock to be baked at a slow rate.

In general, the impregnant of the present invention comprises a concentrated pitch admixture of furfural and a very low Q.I. pitch with between 40–50% by weight of the pitch dissolved in the furfural. The pitch can be derived either from coal tar or petroleum with the coal tar being preferred and should generally have a carbon yield of about 50%.

A catalyst in a concentration of at least 5% by weight preferably about 10% should be included in the impregnant admixture to polymerize the furfural by the application of heat after impregnation. The catalysts which are preferred to polymerize the furfural may be any strong acid such as sulfuric acid, aromatic sulfonic acids, fluorinated carboxylic acids and esters and anhydrides of strong acids. The preferred catalysts should be selected from the group consisting of benzene sulfonic acid, tri-chloroacetic acid, p-toluene sulfonic acid, fluoroacetic acid, methanesulfonic acid, etc. Latent acid catalysts may also be used such as the esters of the above acids e.g. methyl-p-toluene sulfonate, methylbenzene sulfonate, benzenedisulfonic acid-dimethyl ester and the like. The use of a latent acid catalyst is also acceptable although it may result in a lower final carbon yield. A latent catalyst permits a more stable impregnating mixture so that it can be stored for long time periods.

The impregnation procedure in general involves adding the impregnant solution to a carbon or graphite body contained in a vessel maintained at reduced pressure or vacuum followed by reacting the impregnated body to cure the impregnant. The body is then baked in a protected atmosphere. Pressure can also be increased during impregnation to allow the impregnant to fully permeate the carbon or graphite body.

The following examples are illustrative of the invention:

EXAMPLE I

A 48 gram sample of coal tar pitch with a softening point of 100° C., MCC=53% and containing ~0% Q.I. is ground to a powder and dissolved in 52 grams of 2-furfuraldehyde while stirring to form a liquid solution containing 48% by weight of pitch.

A 10 grams sample of liquid diethylsulfate as a catalyst is then dissolved in the solution. The viscosity of the solution was measured at 63 cps.

The impregnant solution was then used to impregnate small 1.9 cm diameter by 8 cm long carbon electrodes. The electrodes had been produced by extruding a blend of calcined petroleum coke and pitch binder followed by baking of the extruded electrode to 900° C. The densities of the baked electrodes were measured as 1.69 g/cc.

The electrodes were dried by the application of heat at 100° C. under vacuum. They were then placed in a vacuum tight reaction vessel which was fitted with a liquid addition funnel containing the catalyzed resin solution. The vessel was evacuated to less than 1 mm pressure and the resin solution was added to the electrodes. The electrodes were maintained immersed in the solution at atmospheric pressure. The impregnated electrodes were removed and heated in an oven at 150° C. at atmospheric pressure for about 1 hour to cure the impregnant. The electrodes lost about 20% by weight during curing. The electrodes were then baked to 705° C. in a protected atmosphere at a rate of 25° C./hour. The carbon yield of the cured impregnant was determined to be 55%. The overall impregnant carbon yield from initial to final bake was 55%×0.80=44%. There was no runout of impregnant during baking. The baked electrodes were graphitized to about 3000° C. The final graphite properties were determined as: density=1.72 g/cc; flexural strength= 2750 psi.

EXAMPLE II

A control sample of the stock of Example I was impregnated with a commercial petroleum pitch having a softening point of 120° C. and a MCC=52%. The impregnation was done at a high temperature of ~200° C. under vacuum. Following introduction of the hot impregnant into the electrodes, they were held under a pressure of 100 psi. The pitch impregnated electrodes were baked and graphitized similarly. The impregnant carbon yield was only 34% and the graphite density was only 1.69 g/cc. The flexural strength was 2767 psi. Extensive runout of pitch occurred during baking.

EXAMPLE III

The same procedure as taught in Example I was employed using a blend of 45% by weight of commercial petroleum pitch in furfural with a 10% diethylsulfate "DES" catalyst. The impregnant carbon yield was 34% and the graphite density was 1.70% g/cc.

EXAMPLE IV

The coal tar pitch/furfural impregnant of Example I was used to impregnate electrodes except that 10% of methyl-p-toluene sulfonate was used as a catalyst rather than diethylsulfate "DES".

The impregnation was done at room temperature on two electrodes. One electrode was then baked at a slow rate of 15° C./hour to 200° C. and held at 200° C. for one hour at atmospheric pressure to effect curing. It was subsequently baked to 750° C. at 25° C./hour and then graphitized to 3000° C.

The second electrode was cured in an autoclave under 200 psi pressure at 200° C. This electrode was then baked to 750° C. at a rate of 25° C./hour and also graphitized. The impregnant carbon yields were 29% for the first electrode and 35% for the pressure cured electrode. The graphite properties were: density=1.69 g/cc; and a flexural strength of 2800 psi for the first and a density of 1.74 g/cc, 3300 psi flexural strength for the second.

EXAMPLE V

A graphite artifact, produced using an isotropic coke, and which was impregnated once with the resin used in Example I. Prior to resin impregnation the graphite sample had a density of 1.69 g/cc and a strength of 5020 psi. The resin impregnated graphite artifact was then baked to 850° C. and the properties were: density=1.81 g/cc and strength=6200 psi.

EXAMPLE VI

A baked carbon electrode produced using an isotropic coke was impregnated once with the resin used in Example I. The impregnated electrode was rebaked to 850° C. and then graphitized by heating to 3000° C. The graphitized electrode had a density of 1.63 g/cc and a flexural strength of 4,320 psi. For comparison an identical electrode was impregnated with a resin prepared by mixing 50% by weight of furfural with a coal tar pitch containing 5% Q.I. and a diethylsulfate catalyst. After baking and graphitization this electrode had a density of 1.61 g/cc and a flexural strength of 3780 psi. The use of a zero Q.I. coal tar pitch in the pitch/furfural mixture therefore gave a 14% higher strength and 0.02 g/cc higher density than the use of a conventional 5% Q.I. containing pitch with furfural and diethylsulfate.

EXAMPLE VII

A carbon foam with a density of 0.25 g/cc and a compressive strength of 317 g/cc was impregnated with the blend of Example I and baked and graphitized. The final density was 0.47 g/cc and the strength was 954 psi. The strength/density ratio was 1654.

The same carbon foam impregnated with pitch gave a density of 0.88 g/cc and strength=868 psi. The strength/density ratio was only 986. The resin system raises strength and still retains the light weight characteristics.

What we claim is:

1. A pitch based impregnant for a carbon or graphite body in the form of a liquid solution of at least 40% by weight of a coal tar pitch or a petroleum pitch in which the solids insoluble in quinoline are present in an amount of less than 1%, said pitch being dissolved in furfural, said solution having a viscosity at room temperature of less than 150 cps and containing at least 5 wt % of an acid catalyst.

2. A pitch based impregnant as defined in claim 1 wherein said acid catalyst is selected from the group consisting of sulfuric acid, aromatic sulfonic acid, fluorinated carboxylic acid and esters and anhydrides of acids.

3. A pitch based impregnant as defined in claim 2 wherein said catalyst concentration is at least about 10% by weight and said viscosity less than 100 cps.

4. A pitch based impregnant as defined in claim 3 wherein said catalyst is selected from the group consisting of benzene sulfonic acid, tri-chloroacetic acid, p-toluene sulfonic acid, methyl-p-toluene sulfonate, methylbenzene sulfonate, benzenedisulfonic acid-dimethyl ester, fluroacetic acid and methanesulfonic acid.

5. A pitch based impregnant as defined in claim 4 wherein said Q.I. content is less than 0.1 percent.

* * * * *

UNITED STATES PATENT AND TRADEMARK OFFICE
CERTIFICATE OF CORRECTION

PATENT NO. : 5,501,729
DATED : March 26, 1996
INVENTOR(S) : I.C. Lewis et al It is certified that error appears in the above-identified patent and that said Letters Patent is hereby corrected as shown below:

Column 1, line 66, change "4,1408332" to --4,140,832--.

Signed and Sealed this

Fifteenth Day of April, 1997

Attest:

BRUCE LEHMAN

Attesting Officer        *Commissioner of Patents and Trademarks*